No. 877,388. PATENTED JAN. 21, 1908.
O. P. WELDING.
TREAD POWER.
APPLICATION FILED AUG. 11, 1906.

2 SHEETS—SHEET 1.

Inventor
O. P. Welding

Witnesses
By O'Meara & Brock
Attorneys

No. 877,388. PATENTED JAN. 21, 1908.
O. P. WELDING.
TREAD POWER.
APPLICATION FILED AUG. 11, 1906.
2 SHEETS—SHEET 2.
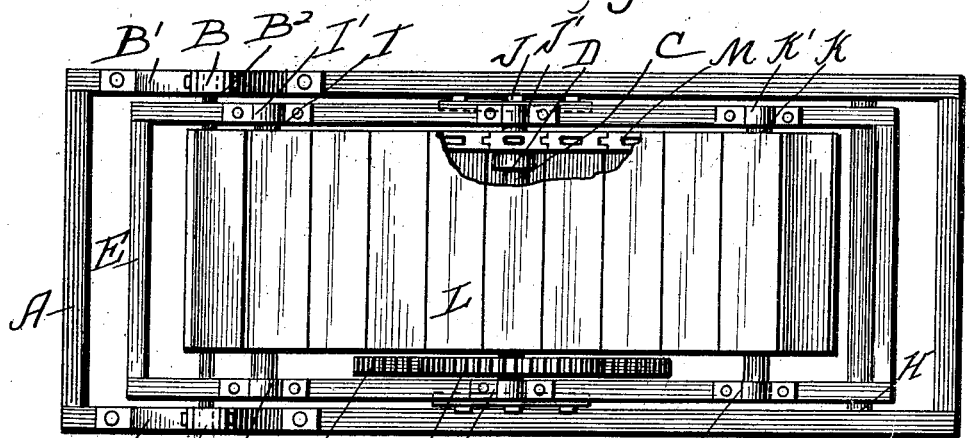
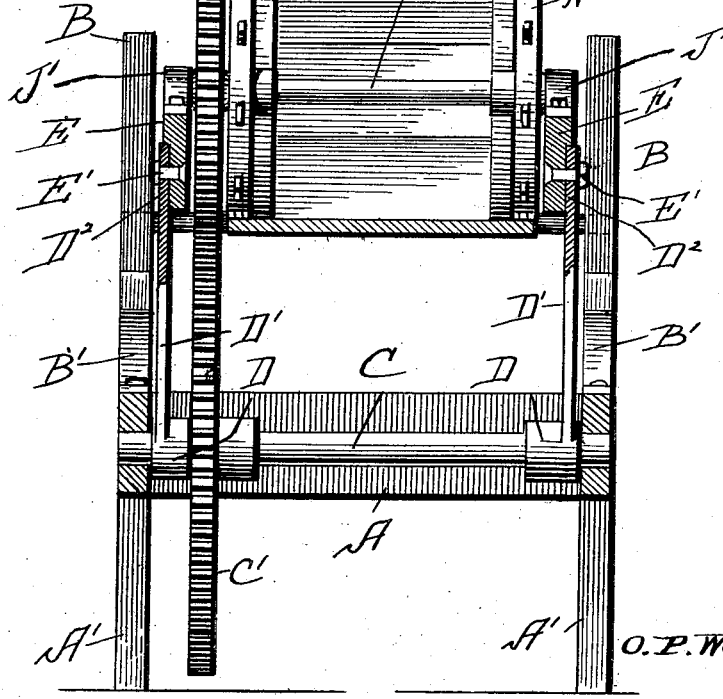
Witnesses
Inventor
O. P. Welding.
By
Attorneys

UNITED STATES PATENT OFFICE.

OVID P. WELDING, OF SIOUX CITY, IOWA.

TREAD-POWER.

No. 877,388.   Specification of Letters Patent.   Patented Jan. 21, 1908.

Application filed August 11, 1906. Serial No. 330,156.

*To all whom it may concern:*

Be it known that I, OVID P. WELDING, a citizen of the United States, residing at Sioux City, in the county of Woodbury and State of Iowa, have invented a new and useful Improvement in a Tread-Power, of which the following is a specification.

This invention relates to certain new and useful improvements in tread powers, the object being to provide a tread power so constructed that the frame carrying the endless belt can be adjusted to any incline desired.

With this and various other objects in view, the invention consists in the novel features of construction, combination and arrangement of parts, hereinafter fully described and pointed out in the claims.

Figure 1:
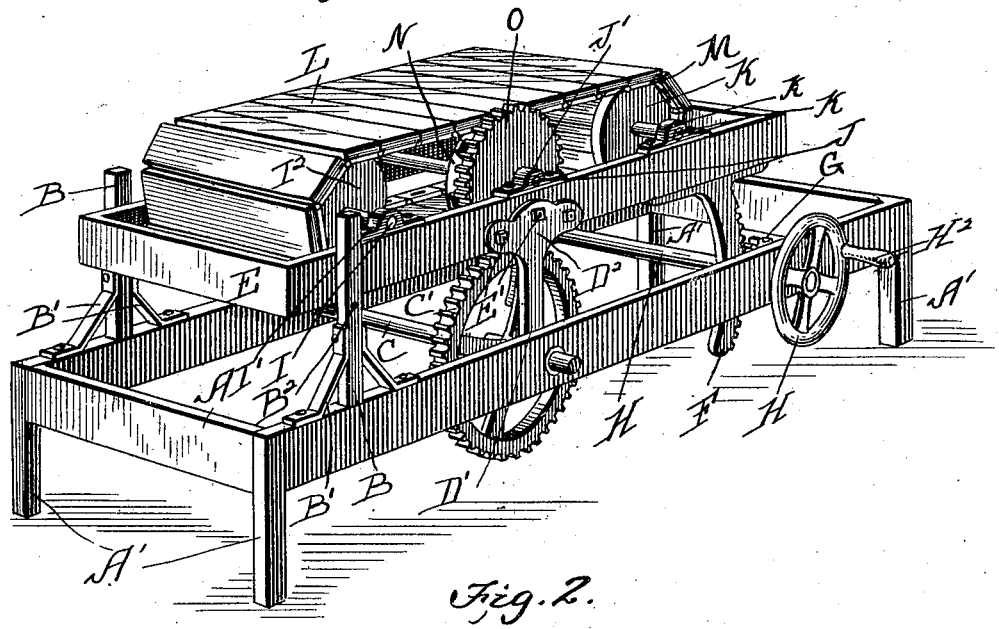
Figure 2:
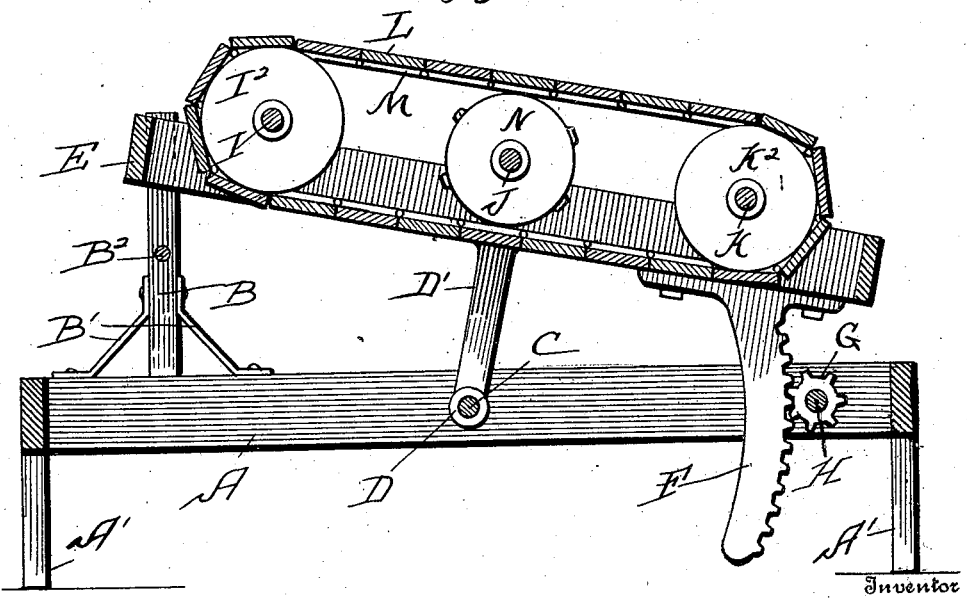

In the drawings forming a part of this specification:—Figure 1 is a perspective view of the tread power showing the frame carrying the endless platform in a horizontal position. Fig. 2 is a longitudinal sectional view of the tread power. Fig. 3 is a top plan view of the tread power partly broken away. Fig. 4 is a vertical sectional view of the tread power.

Referring to the drawings A indicates a main frame mounted on legs A', having standards B secured on the upper edge of its sides adjacent one end, by braces B', connected together by a cross-bar $B^2$. Mounted in the sides of the frame midway of their length is a shaft C having a gear-wheel C' mounted thereon adjacent one end. Sleeves D provided with arms D', are loosely mounted on the shaft adjacent each side piece, provided with enlarged apertured ends $D^2$, to which the sides of the supplementary frame E are secured by bolts E'. Segmental gears F are secured to the under side of the side pieces of the frame E, adjacent one end adapted to mesh with gear-wheels G mounted on the shaft H, which is mounted in the sides of the frame A, adjacent one end. A crank-wheel H' is mounted on one end of the shaft H provided with a handle $H^2$, so that the end of the frame can be raised and lowered as desired and the other end is adapted to rest on the bar $B^2$ when in a horizontal position. Shafts I, J and K are mounted in journal-beams I', J', and K' secured to the upper end of the sides of the frame E, the shafts I and K being provided with wheels $I^2$, $K^2$ adjacent each end on which is mounted an endless platform L, having a sprocket chain M secured to its under side adjacent each edge, adapted to work over sprocket-wheels N mounted on the shaft J, which is also provided with a gear-wheel O meshing with the gear-wheel C', of the shaft C, from which the power is adapted to be transmitted.

From the foregoing description it will be readily seen that I have provided a very novel means for adjusting the incline of the platform so as the space can be increased or decreased as desired.

Having thus fully described my invention, what I claim as new and desire to secure by Letters Patent is:—

1. In a device of the kind described, the combination with a main frame provided with pivoted arms, of a supplementary frame secured between said arms provided with an endless platform and means for raising and lowering one end of said frame carrying the platform, for the purpose described.

2. In a device of the kind described, the combination with a main frame, of arms mounted on said frame a supplementary frame provided with an endless platform carried by said arms and adjusting means connected to one end of said frame, for the purpose described.

3. In a device of the kind described, the combination with a main frame provided with standards connected by cross-bars, of arms pivoted to said frame, a supplementary frame provided with an endless platform carried by said arms, segmental gears secured to one end of said frame and a shaft provided with gear-wheels adapted to mesh with said segmental gears, for the purpose described.

4. In a device of the kind described, the combination with a main frame provided with a shaft, of arms loosely mounted on said shaft, a supplementary frame secured to said arms, shafts mounted on the supplementary frame provided with wheels, an endless platform mounted on said wheels and means for tilting said supplementary frame, for the purpose described.

5. The combination with a main frame provided with a shaft carrying a gear wheel, of arms loosely mounted on said shaft, a supplementary frame secured on said arms provided with a shaft carrying a gear wheel meshing with the gear on the shaft on the main frame, an endless platform mounted on the supplementary frame carrying sprocket-chains, and sprocket-wheels fixed to the shaft carried by the supplementary frame meshing with said chains and means for tilting the supplementary frame, for the purpose described.

6. The combination with a main frame provided with a drive shaft of arms loosely mounted on said shaft a supplementary frame secured between said arms, shafts provided with wheels mounted on the supplementary frame, adjacent each end, an endless platform mounted on said wheels, segmental gears secured to one end of said supplementary frame, a shaft mounted on one end of the main frame provided with gear wheels meshing with said segmental gears, and a fly-wheel secured to said shaft provided with a handle, for the purpose described.

7. The combination with a main frame provided with a shaft carrying a gear wheel, of sleeves provided with arms loosely mounted on said shaft, a supplementary frame carried by said arms, an endless platform mounted on the supplementary frame carrying sprocket-chains, a shaft mounted on said frame provided with a sprocket-wheel meshing with said chains, a gear wheel secured on said shaft meshing with the gear wheel secured on the shaft of the main frame, and means for adjusting one end of the supporting frame, for the purpose described.

8. In a device of the kind described, the combination with a main frame, of pivoted arms mounted on said frame, a frame carried by said arms provided with an endless platform, segmental gears carried by one end of said frame, and a gear-wheel carried by the main frame meshing with said segmental gear for the purpose described.

OVID P. WELDING.

Witnesses:
J. F. HOPKINS,
JOHN A. OLSON.